Figure 3:
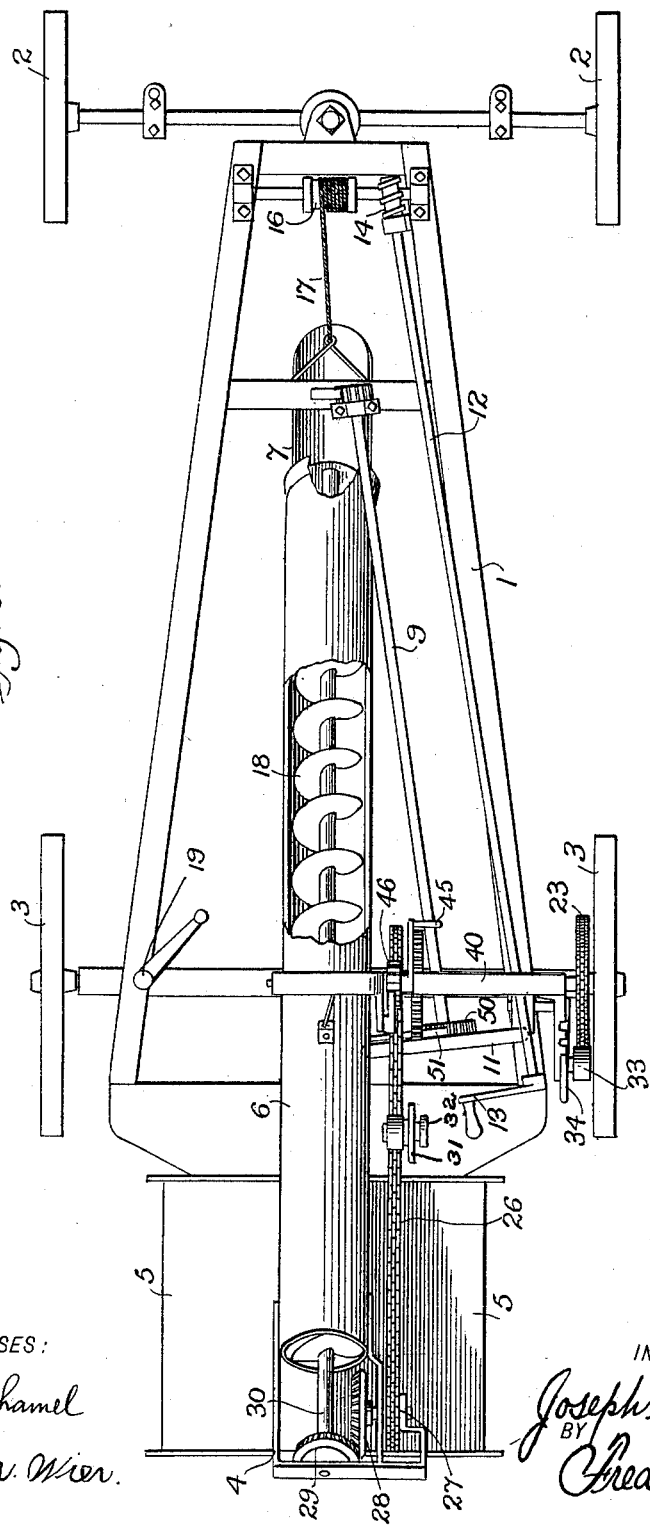

No. 670,787.  
J. H. KOEBEL.  
DITCHING MACHINE.  
(Application filed Aug. 3, 1900.)  
(No Model.)  
Patented Mar. 26, 1901.  
2 Sheets—Sheet 1.
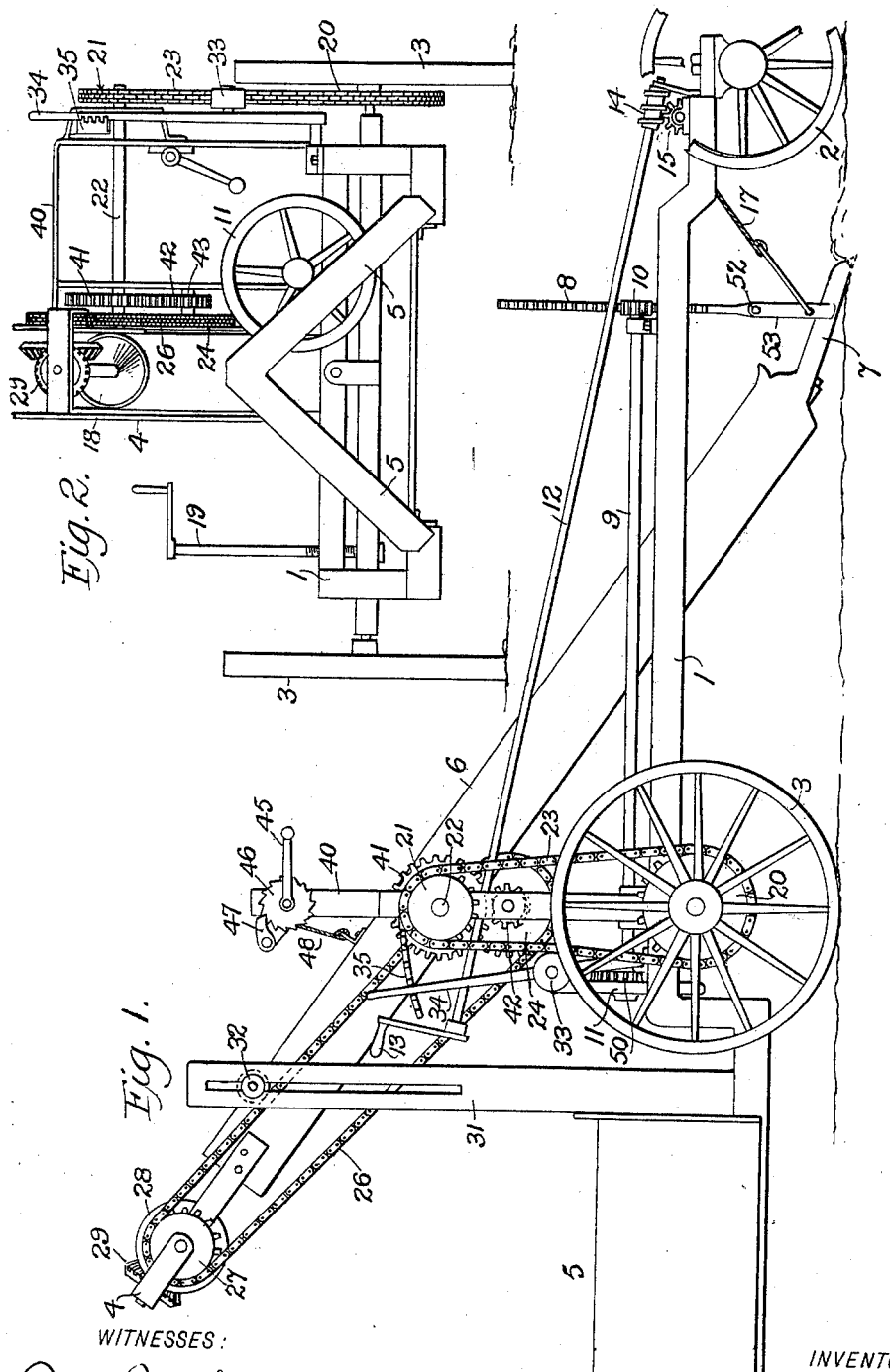
WITNESSES:  
James F. Duhamel.  
Henry W. Wier.
INVENTOR  
Joseph H. Koebel  
BY  
Fred E. Tasker  
ATTORNEYS.

No. 670,787. Patented Mar. 26, 1901.
J. H. KOEBEL.
DITCHING MACHINE.
(Application filed Aug. 3, 1900.)
(No Model.)
2 Sheets—Sheet 2.

WITNESSES:
James F. Duhamel
Henry W. Wier.

INVENTOR
Joseph H. Koebel
BY
Fred E. Tasker
ATTORNEYS.

UNITED STATES PATENT OFFICE.

JOSEPH H. KOEBEL, OF WAYLAND, IOWA.

DITCHING-MACHINE.

SPECIFICATION forming part of Letters Patent No. 670,787, dated March 26, 1901.

Application filed August 3, 1900. Serial No. 25,749. (No model.)

*To all whom it may concern:*

Be it known that I, JOSEPH H. KOEBEL, a citizen of the United States of America, and a resident of Wayland, county of Henry, State of Iowa, have invented certain new and useful Improvements in Ditching-Machines, of which the following is a specification.

My invention relates to an improvement in ditching-machines, having for its main purpose the regulation of the depth and extent of the cut; and it consists, essentially, in the construction and combination of parts, substantially as will be hereinafter described and claimed.

In the annexed drawings, Figure 1 is a side elevation of my improved ditching-machine. Fig. 2 is a partial end elevation of the same. Fig. 3 is a top plan view of the same.

Like numerals denote like parts in all the figures.

1 designates the main horizontal frame, having the front and rear axles, the front one provided with wheels 2 2 and the rear one with wheels 3 3. Fastened on the rear axle and passing through frame 1 is a vertical screw 19, adapted to be turned to the right or left for the purpose of keeping the frame level when the ground is uneven. If the left-hand wheel is on low ground, the screw 19 may be turned to the right until frame 1 is level. If on high ground, said screw will be turned to the left until the frame is level. The rear wheels 3 are fixed rigidly on the axle and preferably have spurs. On said rear axle is a sprocket-wheel 20, around which passes a link chain 23, that also passes around a sprocket-wheel 21 on a shaft 22, supported in a vertical frame 40, erected on the main frame 1 over the rear axle. On this same shaft 22 is a gear-wheel 41, that meshes with a pinion 42, mounted on a short shaft 43, carried in one side of the vertical frame 40, there being on the same short shaft, alongside of the pinion 42, a sprocket-wheel 24, around which passes a link chain 26, that likewise passes around and communicates motion to the sprocket-wheel 27, journaled in the frame 4, carried on the upper end of the conveyer-tube 6.

The tension device for the drive-chain 23 consists of a roller 33, bearing against the chain and carried by a lever 34, pivoted on the frame and engaging the notched sector 35.

On the same shaft or stud that carries the sprocket-wheel 27 is a bevel gear-wheel 28, that meshes with a bevel-pinion 29 on the end of shaft 30 of the screw elevator or conveyer 18, said shaft 30 being journaled at its upper end in a supporting-frame 4, (see Fig. 3,) which is attached to the tube 6.

A vertical slotted standard 31 is mounted on the frame 1 and carries a pulley device 32 therein, having the function of a chain-tightener for the drive-chain 26, said pulley 32 being applied to the chain as shown. The device 32 is fastened in any desired position by means of a set-screw.

The particular and most important feature of my present invention is the dirt-elevating means and its bottom scoop, which latter is made of any desired form, as at 7, to enable it to do its work, being preferably flaring at the front end.

Proceeding to describe the dirt-elevating means and the devices for adjusting the same, it will be observed that 6 designates a long inclined cylinder, tube, or barrel, wherein is a screw elevator or conveyer 18, which takes the dirt from the scoop 7 and carries it up through the tube 6 to the upper end thereof, whence it falls upon the V-shaped hood 5 at the rear of the machine and rolls or slides thence to the right or left side of the ditch.

The scoop or shovel is elevated or depressed, as desired, by means of the gearing connected therewith.

The tube or barrel 6 is raised or lowered at the upper end thereof by means of a crank 45, having a ratchet 46, engaged by a pawl 47, said crank serving to wind or unwind a rope or cable 48, which is attached to the barrel 6, so that by manipulation of the crank 45 the position of the upper end of the elevating means may be determined.

In the front end of frame 1 is a drum 16, on which is wound a rope 17, connected to the front end of scoop 7. The shaft of the drum 16 has a gear-wheel 15 thereon, which is engaged and operated by the worm-wheel 14 on the shaft 12. This shaft runs to the rear end of the machine and is provided with a crank-handle 13. By turning the crank 13, therefore, the scoop is drawn forward. and the rope or chain is lengthened as the ditch grows deeper.

8 indicates a vertical rack-bar, the lower end of which is fastened by a pivot 52 to a yoke 53, pivoted to the scoop 7. This bar 8 is journaled vertically in the main frame and is engaged by a pinion 10 on the end of a rod 9, supported in suitable journal-bearings on the main frame 1, the opposite end of which rod 9 is furnished with a wheel 11, having a ratchet 50, provided with a pawl 51. (See Fig. 3.) This wheel 11 is employed to operate the rack-bar 8 and thus gage the depth of the cut and is in a convenient position to be manipulated by the operator for this purpose. The cranks 13 and 45 are adjusted to accord with the depth of the cut from time to time, while the wheel 11 is operated as often as the inequalities of the ground require.

In using this machine we first stake out the line where the ditch is to be cut. If the ground is of an even and regular grade, there will be no trouble in using the machine, for we simply set the scoop to cut from two to three inches deep, and the machine will be run the full length of the ditch. As the earth is cut by the scoop it will be carried upward by the screw elevator and dropped off upon the rear roof or guide, rolling therefrom at either side of the ditch. After once traversing the length of the ditch the machine will be reversed and run back, cutting the ditch, say, three inches deeper by letting the scoop run three inches lower, and thus the machine will be moved backward and forward until the ditch is completed. If the ground is uneven, as ground usually is, then the elevating and depressing machinery comes into play. In this case we will set the devices to cut about two or three inches at a time until the ditch is of the desired depth in the low places, and then we will commence to level the bottom of the ditch. We then pass over the ground again, and when the low places are approached the operator will grasp the operating-wheel and revolve it rapidly to the right, which operation will elevate the scoop out of the earth. As we approach the higher ground again the scoop will be lowered and again be permitted to cut. This operation is repeated until the bottom of the ditch on the high ground is on a line with that on the low ground, when the ditch may be considered as completed.

What I claim is—

1. In a ditching-machine, the combination with the main frame, of a scoop, a rack-bar journaled vertically in the main frame and supporting said scoop, a rod journaled in the main frame and carrying a pinion which engages the rack-bar, a hand-wheel for operating the rod, a conveyer, means operating the conveyer from the drive-shaft, a shaft journaled in the front of the frame and carrying a pinion, a drum on said shaft having a rope connected to the scoop for drawing the same forward, and a rod carrying a screw which engages said pinion and operates the same.

2. In a ditching-machine, the combination with the main frame, of a scoop, a rack-bar journaled vertically in the main frame, a yoke pivotally connected with the rack-bar and supporting said scoop, a rod journaled in the main frame and carrying a pinion which engages the rack-bar, a hand-wheel for operating the rod, a conveyer, a series of chains and gears connected with the main drive-shaft for operating the conveyer, means for tensioning the chains, means for drawing the scoop forward, a conveyer-tube, and means for supporting and regulating the same.

3. The combination with a scoop, of a barrel or tube, a screw therein, means connected with the main drive-shaft for operating the same, means for regulating the depth of the cut, means for regulating the frame with relation to the drive-shaft, and means for drawing the scoop forward.

Signed at Washington, Iowa, this 30th day of July, 1900.

JOSEPH H. KOEBEL.

Witnesses:
A. S. FOLGER,
JOHN WENGER.